(12) United States Patent
Laakso et al.

(10) Patent No.: US 6,985,700 B1
(45) Date of Patent: Jan. 10, 2006

(54) POWER ESTIMATION METHOD

(75) Inventors: Janne Laakso, Helsinki (FI); Kimmo Valkealahti, Helsinki (FI)

(73) Assignee: Nokia Corporatiion, Espoo (FI)

( * ) Notice: Subject to any disclaimer, the term of this patent is extended or adjusted under 35 U.S.C. 154(b) by 397 days.

(21) Appl. No.: 10/070,849

(22) PCT Filed: Sep. 18, 2000

(86) PCT No.: PCT/FI00/00786

§ 371 (c)(1),
(2), (4) Date: May 3, 2002

(87) PCT Pub. No.: WO01/22617

PCT Pub. Date: Mar. 29, 2001

(30) Foreign Application Priority Data

Sep. 17, 1999 (FI) .................................. 19991994

(51) Int. Cl.
*H04B 1/00* (2006.01)
*H04B 15/00* (2006.01)

(52) U.S. Cl. .................. 455/63.1; 455/67.13; 455/509; 455/501; 455/450; 455/452.1; 455/453; 375/130; 375/148; 370/329; 370/335; 370/441

(58) Field of Classification Search .............. 455/63.1, 455/67.13, 509, 450, 451, 452.1, 442, 453, 455/524; 375/130, 148
See application file for complete search history.

(56) References Cited

U.S. PATENT DOCUMENTS 6,088,326 A * 7/2000 Lysejko et al. ............. 370/209
6,226,277 B1 * 5/2001 Chuah ........................ 370/328
6,289,217 B1 * 9/2001 Hamalainen et al. ....... 455/425
6,317,600 B1 * 11/2001 Salonaho et al. ........... 455/453
6,608,832 B2 * 8/2003 Forslow ..................... 370/353
6,791,959 B1 * 9/2004 Palmer et al. .............. 370/332

FOREIGN PATENT DOCUMENTS

| EP | 0 901 243 A2 | 3/1999 |
| WO | WO 98/24199 | 6/1998 |
| WO | WO 00/38348 | 6/2000 |

OTHER PUBLICATIONS

Bahng S. et al.: "Flexible call admission control schemes for DS-CDMA systems with non-uniform traffic" 1999 IEEE Tencon, vol. 1, Sep. 15-17, 1999, pp. 31-34, XP002901611.
EPO Office Action in EPO Application No. EP 00 960 715.1-2411 dated Mar. 14, 2003, pp. 1-5.

* cited by examiner

*Primary Examiner*—Marceau Milord

(74) *Attorney, Agent, or Firm*—Cohen, Pontani, Lieberman & Pavane

(57) ABSTRACT

The invention is related to control of transmissions in spread spectrum radio systems, more accurately to estimating transmission power increases caused by new transactions in the system. According to the invention, the estimate or interference power increase due to a new transaction is calculated at least partly on the basis of the current fractional load, the current received interference power level, and a load factor $\epsilon L$, which is calculated essentially on the basis of the chiprate, the bitrate of the new transaction, and the estimated required signal-to-interference ratio for the service type of the new transaction.

15 Claims, 1 Drawing Sheet

POWER ESTIMATION METHOD

BACKGROUND OF THE INVENTION

PRIORITY CLAIM

This is a national stage of PCT application No. PCT/FI00/00786, filed on Sep. 18, 2000. Priority is claimed on patent application No. FI 19991994 filed in Finland on Sep. 17, 1999.

1. Field of the Invention

The invention is related to control of transmissions in spread spectrum radio systems, more accurately to estimating transmission power increases caused by new transactions in the system.

2. Description of Related Art

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (IWU) connecting the cellular network to another telecommunications network. The set of parameters associated with a bearer comprises typically for example data transmission speed, allowed delays, allowed bit error rate (BER), and the minimum and maximum values for these parameters. A bearer may further be a packet transmission bearer or a circuit switched bearer and support for example transparent or non-transparent connections. A bearer can be thought of as a data transmission path having the specified parameters connecting a certain mobile terminal and a certain network element for transmission of payload information. One bearer always connects only one mobile terminal to one network element. However, a bearer can pass through a number of network elements. One mobile communication means (ME, Mobile Equipment) may in some cellular telecommunication systems support one bearer only, in some other systems also more than one simultaneous bearers.

In order to be able to transmit information in a desired way, connections over the radio interface have to obtain a desired level of quality. The quality can be expressed for example as the C/I i.e. Carrier to Interference ratio, which indicates the ratio of received carrier wave power to received interfering power. Other measures for the quality of a connection are SIR i.e. Signal to Interference ratio, S/N i.e. Signal to Noise ratio, and S/(I+N) i.e. Signal to Noise plus Interference ratio. The bit error rate (BER) or frame error rate (FER) are also used as measures of connection quality. Typically, a certain target level for one of these or other corresponding measures is determined beforehand, and for each connection, the transmission power is adjusted to be such that the target level is reached as closely as possible. The transmission power should not be higher than what is necessary for obtaining the desired target level, since a too high transmission level wastes electrical energy in the transmitting equipment, which is crucial with handheld mobile stations, and causes interference to other connections.

Admission control is a crucial function in ensuring, that each bearer obtains the desired SIR level. The purpose of admission control is to examine each new request for a new bearer, and determine whether the requested service can be provided without degrading the service to other bearers, taking into account the transmission power of the requested bearer. If the new bearer can be serviced without harming other bearers, the request is admitted. Admission control typically co-operates with power control, whereby the transmission power of some of the other bearers may be adjusted in order to guarantee the SIR target level of the other bearers.

Various admission control algorithms have been proposed in the past. The article "SIR-Based Call Admission Control for DS-CDMA Cellular Systems" by Zhao Liu and Magda El Zarki, 12 Journal on selected areas in communications, vol. 12, no. 4, pp. 638–644, May 1994, describes an algorithm based on the concept of residual capacity. Residual capacity is defined as the additional number of initial calls a base station can accept. If the residual capacity is larger than zero, new calls are admitted. The residual capacity is determined from measured SIR levels and a threshold SIR level.

Another algorithms are described in the article "Call Admission in Power Controlled CDMA Systems" by Ching Yao Huang and Roy D. Yates, in proceedings of 12 VTS 46th Vehicular Technology Conference, Apr. 28–May 1, 1996, Atlanta, USA, pp. 1665–1669. In this article, two simple algorithms are presented. In the first algorithm, a new call is blocked when that new call would cause ongoing calls to transmit at maximum power. In the second algorithm, a new call is blocked if the total received power measured at the base station exceeds a predetermined threshold.

These algorithms function well, when the calls i.e. bearers are relatively similar in terms of resource usage, and any admission thresholds are set to a level where the admission of a bearer does not increase the load too near to the maximum capacity. However, these algorithms do not function well, when the bearers have widely varying properties, i.e. when the network needs to handle both low bit rate bearers such as normal speech bearers, and high bit rate bearers such as high-capacity data bearers or live video bearers. Such a variety of services will be provided for example by the UMTS cellular telecommunication system presently under development. For example, in the conventional algorithm in which a new call is allowed if the total received power measured at the base station is under a predetermined threshold, a high bit rate bearer may increase the network load too near to the maximum capacity. This can be prevented by lowering the threshold so that any high rate bearers allowed close to the threshold still do not increase the total load too much, but in that case, the low bit rate speech bearers end up being refused even if the remaining capacity could accommodate them.

A further admission control approach is to limit the admission by the amount of hardware or, e.g., by the number of connections or by the number of transmitted bits. If we consider admission control schemes that operate for each cell separately, these non-interference based schemes take into account the loading only in the own cell while with an interference based scheme the loading in the adjacent cells can be directly seen in the interference measurements.

SUMMARY OF THE INVENTION

An object of the invention is to realize a method for estimating the interference power increase due to a new transaction in a spread spectrum telecommunication system. A further object of the invention is to provide such a method, which is able to provide more accurate estimates than the prior art methods.

The objects are reached by estimating the interference power increase at least partly on the basis of the current fractional load, the current received interference power level, and a load factor $\Delta L$, which is calculated essentially on the basis of the chiprate, the bitrate of the new transaction, and the estimated required signal-to-interference ratio for the service type of the new transaction.

According to an advantageous embodiment of the invention, the estimate of interference power increase due to a new transaction is calculated at least partly on the basis of the current fractional load, the current received interference power level, and a load factor ΔL, which is calculated essentially as $$\Delta L = \frac{1}{1 + \frac{W}{SIR \cdot R}}$$

where W is the chiprate, R is the bitrate of the new transaction, and SIR is the estimated required signal-to-interference ratio for the service type of the new transaction.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is described in more detail in the following with reference to the accompanying FIG. 1, which illustrates a method according to an advantageous embodiment of the invention.

DETAILED DESCRIPTION OF THE PREFERRED EMBODIMENTS

Figure 1:
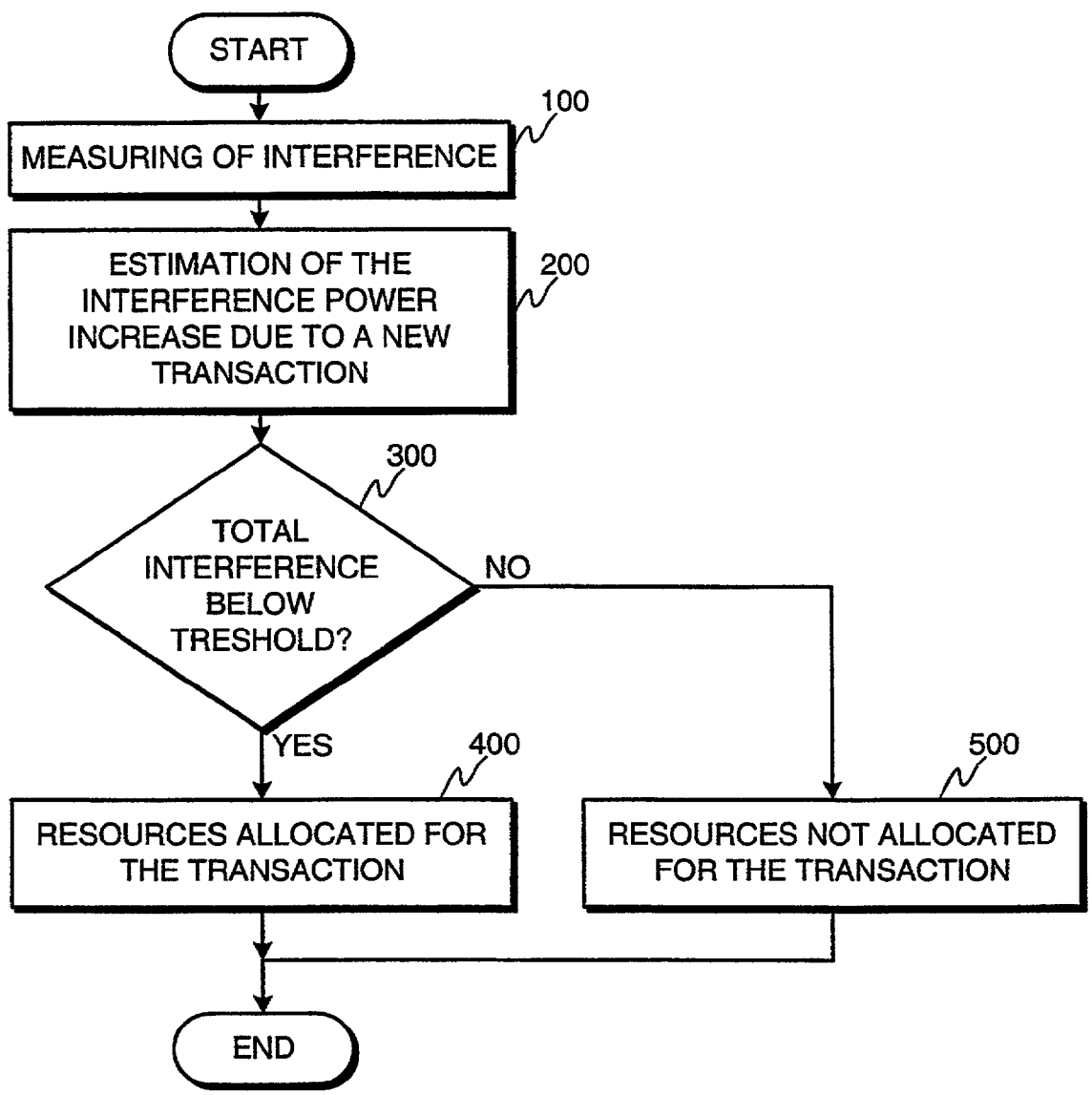

A. A First Advantageous Embodiment of the Invention

According to an important aspect of the invention, the interference power increase due to a new transaction in a radio access network of a spread spectrum telecommunications network is estimated as described below.

The current received total interference power of a base station, $P_{rx\_total}$, can be divided into the interference from the intra-cell users, $P_{rx\_own}$, inter-cell users, $P_{rx\_oth}$, and system noise, $P_N$, which is the interference power of the unloaded system (no interference from this carrier). Moreover, the total power can also be expressed as the sum of the non-controllable power, $P_{rx\_nc}$, and the controllable power of non-real time users, $P_{rx\_nrt}$:

$$P_{rx\_total} = P_{rx\_own} + P_{rx\_oth} + P_N = P_{rx\_nc} + P_{rx\_nrt} \quad (1)$$

The non-controllable power, $P_{rx\_nc}$, consists of the powers of real time users, inter-cell users, and noise. Packet scheduler allocates the controllable power, $P_{rx\_nrt}$, to the packet users. Admission control estimates the increase in the total power due to the new user. Eq. (1) can be transformed into the form:

$$P_{rx\_total} = P_{rx\_own} + \frac{P_{rx\_oth}}{P_{rx\_own}} P_{rx\_own} + P_N \quad (2)$$

$$= (1 + i) \cdot P_{rx\_own} + P_N$$

$$= \frac{P_{rx\_own}}{F} + P_N$$

-continued $$= \frac{P_{rx\_total} - P_N}{P_{rx\_total}} \cdot P_{rx\_total} + P_N$$

$$= \eta \cdot P_{rx\_total} + P_N$$

where the ratio of the received inter-cell to inter-cell powers i can be described with $$i = \frac{P_{rx\_oth}}{P_{rx\_own}} = \frac{P_{rx\_total} - P_{rx\_own} - P_N}{P_{rx\_own}} \Leftrightarrow i = \frac{1}{F} - 1 = \frac{1-F}{F} \quad (3)$$

and where $$F = \frac{P_{rx\_own}}{P_{rx\_total} - P_N} \quad (4)$$

and $$P_{rx\_own} = \sum_{i=1}^{M} \frac{1}{1 + \frac{W}{SIR_i \cdot R_i}} \quad (5)$$

is the intra-cell total interference power where $SIR_i$ is the signal-to-interference ratio of the $i^{th}$ user, $R_i$ is the bitrate of the $i^{th}$ user, W is the chiprate and M is the number of infra-cell active users.

$$P_{rx\_oth} = i \cdot P_{rx\_own} \quad (6)$$

is the inter-cell interference power, and thus, the total uplink interference power can be calculated as follows $$P_{rx\_total} = (1 + i) \cdot P_{rx\_own} + P_N \quad (7)$$

$$= (1 + i) \cdot \sum_{i=1}^{M} \frac{1}{1 + \frac{W}{SIR_i \cdot R_i}} + P_N$$

From Eq. (2) the total received power can be solved as $$P_{rx\_total} = \frac{P_N}{1 - \eta} \quad (8)$$

The noise rise, NR, which can be measured by the base station, is defined as the ratio of the total received power to the system noise, $$NR = \frac{P_{rx\_total}}{P_N} = \frac{1}{1 - \eta} \quad (9)$$

The value of n is obtained as $$\eta = \frac{NR-1}{NR} \qquad (10)$$

which is called the fractional load. The fractional load η is normally used as the uplink load indicator. For example, if the uplink load is said to be 60% of the whole capacity, it means that the fractional load η=0.60.

The uplink interference power $I_{total}$ increases when the fractional load η increases. The coverage area will shrink if the fractional load increases too much. Therefore, the admission control and load control algorithms are used.

From Eqs. (8)–(10) the actual derivative power increase estimates can be calculated as follows:

$$\frac{dP_{rx\_total}}{d\eta} = \frac{d}{d\eta}\left(\frac{P_N}{1-\eta}\right) \Leftrightarrow \frac{dP_{rx\_total}}{d\eta} = \qquad (11)$$

$$\frac{P_N}{(1-\eta)^2} \Leftrightarrow \frac{dP_{rx\_total}}{d\eta} = \frac{P_N}{\left(1-\frac{P_{rx\_total}-P_N}{P_{rx\_total}}\right)^2} \Leftrightarrow \frac{dP_{rx\_total}}{d\eta} =$$

$$\frac{P_{rx\_total}^2}{P_N} \Leftrightarrow \frac{dP_{rx\_total}}{d\eta} = \frac{1}{1-\eta}P_{rx\_total} \Rightarrow$$

$$\Delta P_{rx\_total} \approx \frac{dP_{rx\_total}}{d\eta}\Delta L \Leftrightarrow \Delta P_{rx\_total} \approx \frac{\Delta L}{1-\eta}P_{rx\_total}$$

where $$\Delta L = \frac{1}{1+\frac{W}{SIR \cdot R}} \qquad (12)$$

ΔL is the load factor of the new transaction under consideration, W is the chiprate, R is the bitrate of the new transaction and SIR is the estimated required signal-to-interference ratio for the transaction.

B. A Second Advantageous Embodiment of the Invention

According to a further advantageous embodiment of the invention, the uplink power increase can be estimated as follows:

$$P_{rx\_total} = \frac{P_N}{1-\eta} \Rightarrow \frac{dP_{rx\_total}}{d\eta} = \qquad (13)$$

$$\frac{P_N}{(1-\eta)^2} \Leftrightarrow \Delta P_{rx\_total} = \int_\eta^{\eta+\Delta L} dP_{rx\_total} \Leftrightarrow \Delta P_{rx\_total} =$$

$$\int_\eta^{\eta+\Delta L} \frac{P_N}{(1-\eta)^2} d\eta \Leftrightarrow \Delta P_{rx\_total} =$$

$$\frac{P_N}{1-\eta-\Delta L} - \frac{P_N}{1-\eta} \Leftrightarrow \Delta P_{rx\_total} =$$

$$\frac{\Delta L}{1-\eta-\Delta L}\frac{P_N}{1-\eta} \Leftrightarrow \Delta P_{rx\_total} = \frac{\Delta L}{1-\eta-\Delta L}P_{rx\_total}$$

C. A Third Advantageous Embodiment of the Invention

In a further advantageous embodiment of the invention, multiuser detection is used to cancel at least some of the effect of intra-cell interference. The uplink power increase estimation method with multiuser detection can be calculated as follows:

$$\Delta P_{rx\_total} = \frac{(1-\beta)\cdot \Delta L}{1-\eta-(1-\beta)\cdot \Delta L}P_{rx\_total} \qquad (14)$$

where β is the efficiency of the multiuser detection i.e. the percentage of the intra-cell interference cancelled by the multiuser detector. When b equals 1, the of uplink intra-cell interference is perfectly cancelled, i.e. intra-cell users are perfectly orthogonal, and when β equals 0 no uplink multiuser detection is performed, i.e. the receiver is in effect a basic Rake receiver.

D. A Fourth Advantageous Embodiment of the Invention

FIG. 1 illustrates a method according to an advantageous embodiment of the invention. The method is used for deciding, if resources can be allocated for a new transaction. The transaction can be for example a new connection or the transmission of a new packet of data. The method can be applied in spread spectrum telecommunication systems.

According to the method, the current received interference power is measured 100 at a receiver, whereafter the interference power increase due to a new requested connection is estimated 200. Next, it is checked 300 if the total interference power, i.e. the sum of the measured interference level and the estimated increase is below a threshold. If the total is below the threshold, resources are allocated 400 for the transaction. If the total is not below the threshold, resources are not allocated 500 for the transaction.

E. A Fifth Advantageous Embodiment of the Invention

In a further advantageous embodiment of the invention, the previously described interference power increase estimation method is used in admission control, i.e. the transaction mentioned previously is a new requested connection. According to the present embodiment, the admission control method in a spread spectrum cellular telecommunication system comprises steps in which the current received interference power is measured at a receiver, the interference power increase due to a new requested connection is estimated at least partly on the basis of current fractional load, current received interference power level, and load factor ΔL, which is calculated essentially as $$\Delta L = \frac{1}{1+\frac{W}{SIR \cdot R}}$$

where W is the chiprate, R is the bitrate of the new connection, and SIR is the estimated required signal-to-interference ratio for the service type of the new connection, the sum of said current received interference power and said interference power increase is compared to a threshold, and resources are allocated for the new requested connection, if said sum is smaller than said threshold.

According to a further aspect of the invention, the interference power increase estimate $\Delta P_{rx\_total}$ can be calculated essentially as $$\Delta P_{rx\_total} = \frac{\Delta L}{1 - \eta - \Delta L} P_{rx\_total}$$

where η is the current fractional load.

According to a still further aspect of the invention, the interference power increase estimate $\Delta P_{rx\_total}$ can be calculated essentially as $$\Delta P_{rx\_total} = \frac{\Delta L}{1 - \eta} P_{rx\_total}$$

where η is the current fractional load.

F. A Sixth Advantageous Embodiment of the Invention

In a further advantageous embodiment of the invention, the previously described interference power increase estimation method is used in packet scheduling, i.e. the transaction mentioned previously is the transmission of a new packet of data. According to the present embodiment, the method for scheduling data packets in a spread spectrum cellular telecommunication system comprises steps in which

- the current received interference power is measured at a receiver,
- the interference power increase due to a transmission of a new packet is estimated at least partly on the basis of current fractional load, current received interference power level, and load factor ΔL, which is calculated essentially as $$\Delta L = \frac{1}{1 + \frac{W}{SIR \cdot R}}$$

where W is the chiprate, R is the bitrate which will be used in transmission of the packet, and SIR is the estimated required signal-to-interference ratio for the successful transmission and reception of the packet,

- the sum of said current received interference power and said interference power increase is compared to a threshold, and
- resources are allocated for the transmission of the packet, if said sum is smaller than said threshold.

According to a further aspect of the invention, the interference power increase estimate $\Delta P_{rx\_total}$ can be calculated essentially as $$\Delta P_{rx\_total} = \frac{\Delta L}{1 - \eta - \Delta L} P_{rx\_total}$$

where η is the current fractional load.

According to a still further aspect of the invention, the interference power increase estimate $\Delta P_{rx\_total}$ can be calculated essentially as $$\Delta P_{rx\_total} = \frac{\Delta L}{1 - \eta} P_{rx\_total}$$

where η is the current fractional load.

G. A Seventh Advantageous Embodiment of the Invention

According to a further advantageous embodiment of the invention, a system in a spread spectrum cellular telecommunication system for estimating the interference power increase in the uplink direction due to a new transaction is provided. According to the present embodiment, the system comprises means for calculating the interference power increase estimate at least partly on the basis of

- current fractional load,
- current received interference power level, and
- a load factor ΔL, and means for calculating the load factor as $$\Delta L = \frac{1}{1 + \frac{W}{SIR \cdot R}}$$

where W is the chiprate, R is the bitrate of the new transaction, and SIR is the estimated required signal-to-interference ratio for the service type of the new transaction.

According to a further aspect of the invention, the system may be comprised in a network element, such as a radio network controller (RNC). The radio network controller may be part of a radio access network (RAN) of the UMTS telecommunications network.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for estimating an interference power increase in an uplink direction due to a transaction in a spread spectrum cellular telecommunication system, comprising calculating the interference power increase estimate at least partly on a basis of:
   - current fractional load,
   - current received interference power level, and
   - a load factor ΔL, which is calculated in accordance with the relationship $$\Delta L = \frac{1}{1 + \frac{W}{SIR \cdot R}},$$

where W is a chiprate, R is a bitrate of a new transaction, and SIR is an estimated required signal-to-interference ratio for a service type of the new transaction.

2. The method of claim 1, wherein the interference power increase estimate $\Delta P_{rx\_total}$ is calculated in accordance with the relationship $$\Delta P_{rx\_total} = \frac{\Delta L}{1 - \eta - \Delta L} P_{rx\_total},$$

where $\eta$ is a current fractional load.

3. The method of claim 1, wherein the interference power increase estimate $\Delta P_{rx\_total}$ is calculated in accordance with the relationship $$\Delta P_{rx\_total} = \frac{\Delta L}{1 - \eta} P_{rx\_total},$$

where $\eta$ is a current fractional load.

4. The method of claim 1, wherein the transaction is a new connection.

5. The method of claim 1, wherein the transaction is a transmission of a data packet.

6. An admission control method in a spread spectrum cellular telecommunication system, the method comprising the steps of:

measuring a current interference power received at a receiver, estimating an interference power increase due to a new requested connection is estimated at least partly on a basis of current fractional load, current received interference power level, and a load factor $\Delta L$, which is calculated in accordance with the relationship $$\Delta L = \frac{1}{1 + \frac{W}{SIR \cdot R}},$$

where W is a chiprate, R is a bitrate of the new requested connection, and SIR is an estimated required signal-to-interference ratio for a service type of the new requested connection, comparing a sum of said current received interference power and said interference power increase to a threshold, and allocating resources for the new requested connection, if said sum is smaller than said threshold.

7. The method of claim 6, wherein the interference power increase estimate $\Delta P_{rx\_total}$ is calculated in accordance with the relationship $$\Delta P_{rx\_total} = \frac{\Delta L}{1 - \eta - \Delta L} P_{rx\_total},$$

where $\eta$ is the current fractional load.

8. The method of claim 6, wherein the interference power increase estimate $\Delta P_{rx\_total}$ is calculated in accordance with the relationship $$\Delta P_{rx\_total} = \frac{\Delta L}{1 - \eta} P_{rx\_total},$$

where $\eta$ is the current fractional load.

9. A method for scheduling data packets in a spread spectrum cellular telecommunication system, the method comprising the steps of:

measuring a current interference power received at a receiver, estimating the interference power increase due to a transmission of a new packet at least partly on a basis of current fractional load, current received interference power level, and a load factor $\Delta L$, which is calculated in accordance with the relationship $$\Delta L = \frac{1}{1 + \frac{W}{SIR \cdot R}},$$

where W is a chiprate, R is a bitrate which will be used in transmission of the packet, and SIR is an estimated required signal-to-interference ratio for the successful transmission and reception of the packet, comparing a sum of said current received interference power and said interference power increase to a threshold, and allocating resources for the transmission of the packet, if said sum is smaller than said threshold.

10. The method of claim 9, wherein the interference power increase estimate $\Delta P_{rx\_total}$ is calculated in accordance with the relationship $$\Delta P_{rx\_total} = \frac{\Delta L}{1 - \eta - \Delta L} P_{rx\_total},$$

where $\eta$ is the current fractional load.

11. The method of claim 9, wherein the interference power increase estimate $\Delta P_{rx\_total}$ is calculated in accordance with the relationship $$\Delta P_{rx\_total} = \frac{\Delta L}{1 - \eta} P_{rx\_total},$$

where $\eta$ is the current fractional load.

12. A system for estimating the interference power increase in an uplink direction due to a new transaction in a spread spectrum cellular telecommunication system, the system comprising:

means for calculating the interference power increase estimate at least partly on a basis of
current fractional load,
current received interference power level, and
a load factor $\Delta L$, and means for calculating said load factor $\Delta L$ in accordance with the relationship $$\Delta L = \frac{1}{1 + \frac{W}{SIR \cdot R}},$$

where W is a chiprate, R is a bitrate of the new transaction, and SIR is an estimated required signal-to-interference ratio for a service type of the new requested transaction.

13. A network element of a cellular telecommunications network, the network element comprising:

means for calculating an interference power increase estimate due to a new transaction at least partly on a basis of current fractional load, current received interference power level, and a load factor ΔL, and means for calculating said load factor in accordance with the relationship $$\Delta L = \frac{1}{1 + \frac{W}{SIR \cdot R}},$$

where W is a chiprate, R is a bitrate of the new transaction, and SIR is an estimated required signal-to-interference ratio for the service type of the new transaction.

14. The network element of claim 13, wherein the network element is a radio network controller.

15. The network element of claim 13, wherein the network element is a radio network controller of a UMTS cellular system.

* * * * *